United States Patent [19]
Do

[11] Patent Number: 6,055,830
[45] Date of Patent: May 2, 2000

[54] OPTICAL FIBER SPINNING APPARATUS AND METHOD

[75] Inventor: Mun-Hyun Do, Gumi, Rep. of Korea

[73] Assignee: SamSung Electronics Co., Ltd., Kyungki-do, Rep. of Korea

[21] Appl. No.: 08/897,253

[22] Filed: Jul. 18, 1997

Related U.S. Application Data

[62] Division of application No. 08/723,132, Sep. 30, 1996, abandoned.

[30] Foreign Application Priority Data

Sep. 29, 1995 [KR] Rep. of Korea ..................... 95/33105

[51] Int. Cl.⁷ ............................................. C03B 37/029
[52] U.S. Cl. .............................. 65/412; 65/537; 65/540
[58] Field of Search ........................ 65/537, 540, 486, 65/435, 412

[56] References Cited

U.S. PATENT DOCUMENTS

| 4,383,843 | 5/1983 | Iyengar | 65/537 |
| 5,133,796 | 7/1992 | Tsychiya | 65/374.15 |

FOREIGN PATENT DOCUMENTS

| 601601 | 6/1994 | European Pat. Off. | 65/435 |
| 63-176330 | 7/1988 | Japan | 65/435 |
| 64-24045 | 1/1989 | Japan | 65/435 |

Primary Examiner—John Hoffmann
Attorney, Agent, or Firm—Robert E. Bushnell, Esq.

[57] ABSTRACT

A furnace minimizes the lowering of the quality of optical fibers, especially those lowerings of the quality that stems from variations of the conditions inside of the furnace. These variations can occur when a preform is connected to an auxiliary quartz rod of differing diameters. Also, the furnace has an inlet sleeve which minimizes fluctuations in flow speed of the inert gases and the pressures inside the furnace.

25 Claims, 4 Drawing Sheets

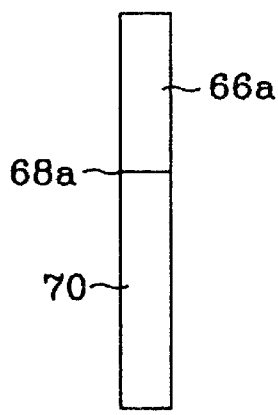
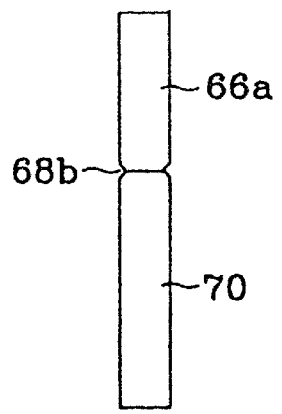
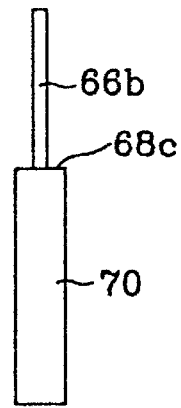
Fig. 2A  Fig. 2B  Fig. 2C
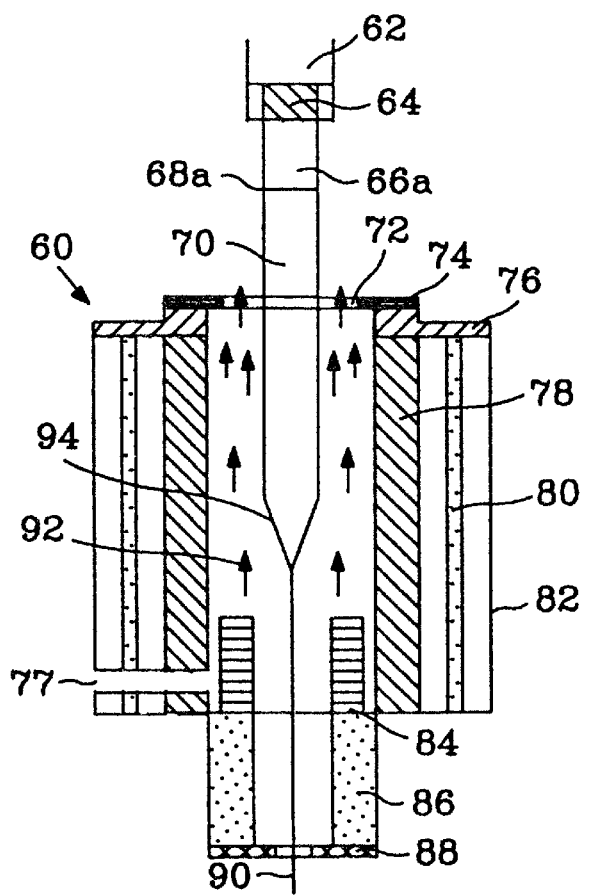
Fig. 3

A: HEIGHT OF INLET SLEEVE
B: INNER DIAMETER OF INLET SLEEVE
C: INNER DIAMETER OF GROOVE
D: WIDTH OF GROOVE
E: DISTANCE BETWEEN GROOVES

OPTICAL FIBER SPINNING APPARATUS AND METHOD

This is a division of application Ser. No. 08/723,132, filed Sep. 30, 1996. now abandoned

CLAIM FOR PRIORITY

This application makes reference to, incorporates the same herein, and claims all benefits accruing under 35 U.S.C. §119 from an application for *Optical Fiber Spinning Apparatus And Method* earlier filed in the Korean Industrial Property Office on Sep. 29, 1995 and there duly assigned Serial No. 33105/1995.

BACKGROUND OF THE INVENTION

This invention relates to the optical fiber fabrication generally, and more particularly to effective utilization of optical fiber preforms while maintaining the quality of resulting optical fibers.

Representative exemplars of the manufacture of optical fibers from an optical fiber preform are found in Saito et al. (U.S. Pat. No. 5,417,399, *Apparatus for Supporting Article in Heating Furnace*, May 23, 1995) discussing securing a glass article to a rotary shaft. A slot is provided for receiving a cylindrical projection formed at an upper end of the glass article. Gunther et al. (U.S. Pat. No. 5,127,929, *Process for the Manufacturing of Optical Waveguides with Fusion of a Sleeving Tube onto a Mother Preform*, Jul. 7, 1992) discusses inserting a rod inside a tube and collapsing the tube. Meerman (U.S. Pat. No. 4,617,041, *Method for Continuously Manufacturing Elongaoted Bodies Starting from Unmolten Solid Starting Material*, Oct. 14, 1986) teaches melting glass in a melting tube. Titchmarsh (U.S. Pat. No. 4,217,123, *Double Crucible Method of Optical Fiber Manufacture*, Aug. 12, 1980) teaches use of two crucibles. Philips (U.S. Pat. No. 4,145,201, *Glass Fiber Producing and Collecting Apparatus*, Mar. 20, 1979) discusses a speed control for a glass fiber production. As stated above, an optical fiber is manufactured from optical fiber preforms. As the cost of the optical fiber preform is significant, there is a need for maximizing the use of the optical fiber preform without lowering the quality of the resulting optical fiber. In this regard, one of the problems in the art that I have found is the fluctuations of the conditions within a furnace of a optical fiber fabrication device. Irregularities in structures that enter the furnace is a cause of the fluctuations. For examples, fluctuations in pressure can occur due to a localized diameter variation fonned when an optical fiber preform and an auxiliary quartz rod are joined. I have found that the art has a need for an apparatus and a method that can solve this problem without overly raising cost.

SUMMARY OF THE INVENTION

Accordingly, it is an object of the present invention is to provide an improved optical fiber fabrication.

It is another object to provide a more effective utilization of optical fiber preforms while maintaining the quality of resulting optical fibers.

It is still another object to minimize the pressure changes in the furnace.

It is yet another object to minimize changes in the speed of flow of the inert gases in a furnace.

It is a further object to provide a technique for more easily connecting a preform of optical fibers to an auxiliary quartz rod.

It is a still further object improve the quality of an optical fiber.

To satisfy one or more the above objects, an optical fiber fabrication apparatus is provided that has a furnace With an inlet sleeve. The inlet sleeve has an inner surface and a first opening. The inner surface of the inlet sleeve includes a groove around an inner circumference of the inlet sleeve. The inlet sleeve resists a flow of inert gas from within the furnace. A heater heats an optical fiber preform entering the furnace through the first opening, so as to allow an uncoated optical fiber to be drawn through a second opening. To provide a more consistent structure connectable to the optical fiber preform, the fabrication apparatus uses an auxiliary quartz rod having an outer diameter smaller than an outer diameter of the optical fiber preform. An auxiliary quartz tube covers the rod, then the resulting structure of the tube, the rod, and the preform is mounted with a chuck. Then, the resulting structure is inserted into the furnace.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in at which like reference symbols indicate the same or similar components, wherein:

FIG. 2A illustrates one situation of an optical fiber preform connected to an auxiliary quartz rod;

FIG. 2B illustrates an another situation of an optical fiber preform connected to an auxiliary quartz rod;

FIG. 2C illustrates yet another situation of an optical fiber preform connected to an auxiliary quartz rod;

FIG. 3 is a sectional view of a structure of a furnace of a hypothetical conventional optical fiber spinning apparatus;

DETAILED DESCRIPTION OF THE INVENTION

Figure 1:
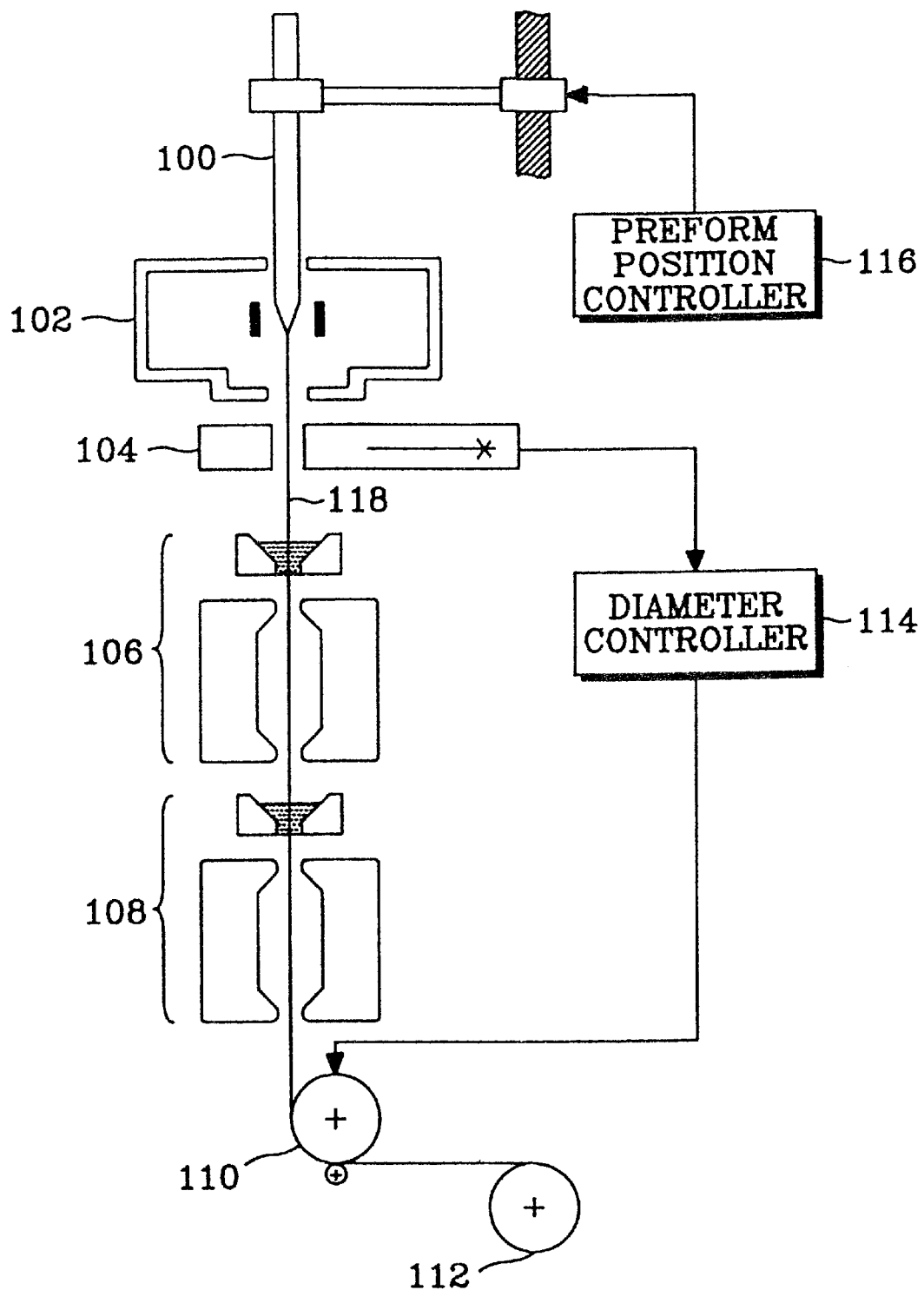
FIG. 1 is a block diagram of an optical fiber spinning apparatus.

Turning now to the drawings, referring to FIG. 1, an optical fiber is made from an optical fiber preform 100. The optical fiber preform 100 is fed slowly into a furnace 102. The rate of feeding of optical fiber preform 100 into the furnace 102 is controlled by the positioning mechanism of a position controller 116. Inside the furnace 102, the temperature is usually thousands of degrees Celsius, and is typically 2100° C.–2300° C. At these temperatures, the furnace 102 melts the optical fiber preform 100. This allows a bare optical fiber 118 to be melted and drawn from the preform 100. The bare optical fiber 118 is pulled out through a tapered end (not shown). A capstan 110 provides the pulling force applied to the bare optical fiber 118. An outer diameter detector 104 makes a determination as to whether an outer diameter of the bare optical fiber 118 conforms to a predetermined value, typically being 125 μm. Then, the outer diameter detector 104 provides the result to a diameter controller 114. By controlling the capstan 110, the diameter controller 114 maintains the diameter of the bare optical fiber at 125 μm. The diameter controller 114 sends control signals to the capstan 110. In response to control signals from the diameter controller 114, the capstan 110 rotates. This rotation of the capstan 110 adjusts the pulling tension applied to the bare optical fiber 118. The bare optical fiber 118 eventually moves to a primary coating unit 106 and a secondary coating unit 108. After the bare optical fiber 118 is cooled, the primary coating unit 106 and the secondary coating unit 108 coat the bare optical fiber with protective acrylic resin or with protective silicon resin. Afterwards, the optical fiber pulled out of the secondary coating unit 108 by the pulling tension of the capstan 110 is wound around a spool 112. Thus, the optical fiber is manufactured.

Referring to FIG. 3, a furnace 60 liquefies an optical fiber preform 70 at a high temperature. After liquefying the optical fiber preform 70, the furnace 60 spins out an optical fiber 90. Inside the furnace 70, a heating element 78 is installed to generate a large amount of heat. The heating element 78 has a high electrical resistance. Around the heating element 78, an insulator 80 is installed to prevent the heat generated in the heating element 78 from escaping. A bottom sleeve 84 made of graphite is installed near a bottom end of the heating element 78, inside the heating element 78. At a top and bottom of the heating element 78, a gas-diffuser 76, 77 is installed to provide inert gases 92. At a top end of gas-diffuser 76, 77, a thin quartz tube 74 is installed. The thin quartz tube 74 extracts inert gases 92. At the other end of the furnace 60 from the thin quartz tube 74, at a bottom end of the furnace 60, below the bottom sleeve 84, an extended unit 86 is installed. At a bottom end of an extended unit 86, an iris 88 is installed. The iris 88 controls a size of the hole (not labeled) through which the optical fiber 90 is drawn. Thus, the furnace 60 melts the optical preform 70 and sends out the optical fiber 90.

The optical fiber fabrication apparatus liquefies the preform 70 at high temperatures, usually above 2000° C., in the furnace 60 to spin out an optical fiber 90 of 125 μm diameter. Generally a graphite resistance furnace 60 is used. However, the graphite resistance furnace 60 generates graphite powder at high temperature. This generating of graphite powder could have an detrimental effect on the fabrication of the optical fiber 90. In particular, the mechanical properties of the optical fiber 90 may be affected. To help solve this problem, the graphite resistance furnace 60 is equipped with the gas-diffuser 76, 77. The gas diffuser 76, 77 causes inert gas 92, for example Argon or Helium, to flow in the furnace 60. This helps in maintaining a uniform quality in the resulting optical fiber 90. After flowing in the furnace 60, the inert gases leave the furnace through a first gap 72 formed between the thin quartz tube 74 and the optical fiber preform 70 located on the top of the furnace 60. With typical conditions inside the furnace 60, i.e. a typical pressure inside of the furnace 60 exerted by the supplied inert gases 92 and a uniform flow of the inert gases 92, the furnace 60 should be steady. To obtain steady conditions inside the furnace 60, a thin quartz tube 74 is installed on the top of the furnace 60. This permits the optical fiber preform 70 to be inserted through the quartz tube 74 and to be moved towards the center of the furnace 60. During this insertion and movement of the optical fiber preform 70, the gap between the quartz tube 74 and the optical fiber preform 70 is maintained at approximately 1 mm.

In the furnace 60 described in the previous paragraph, conditions within the furnace 60 change drastically as the optical fiber preform 70 with slightly uneven diameters passes through the top region of the furnace 60. This occurrence is due to the inert gases 92 easily leaving the furnace 60. If the inert gases 92 leave so easily without experiencing any severe restriction, the quality of the produced optical fibers 90 is lowered. Due to this and other problems with the diameter of the optical fiber preform 70, a chuck 62 is used in producing optical fibers 90. For a optical fiber preform 70 of a large diameter to be used in fabricating an optical fiber 90, the optical fiber preform 70 needs to be mounted in a chuck 62 of the optical fiber fabrication apparatus.

Due to this mounting in the chuck 62 (approximately 50 mm) and the distance between the quartz tube 74 at the top and the preform melting region 26 (approximately 150 mm), at least 200 mm of the optical fiber preform 70 is not used for spinning optical fibers 90. As an optical fiber preform 70 is expensive, there is a need for maximizing the use of the optical fiber preform 70.

As illustrated at FIGS. 2A, 2B, and 2C, a contemporary practice attaches an auxiliary quartz rod, as marked by reference numeral 66a and 66b, to one end of an optical fiber preform 70. The most effective connection for the optical fiber fabrication operation is achieved when the quartz rod 66a and the optical fiber preform 70 are of the same diameter as in FIG. 2A. FIG. 2A shows a smooth connection 68a between the quartz rod 66a and the optical fiber preform 70. For optical fiber preforms 70 of large diameters, e.g., 40 mm–80 mm, connecting an auxiliary quartz rod 66a of the same diameter as that of the optical fiber preform 70 is difficult. For optical fiber preforms 70 of such diameters, the smooth connection exemplified in FIG. 2A as 68a does not easily result. Even when possible to connect, the connection process consumes much time. Moreover, the diameters of the optical fiber preform 70 and the auxiliary quartz rod 66a easily mismatches, as in connection exemplified in FIG. 2B as in 68b. Further, the connection is not made uniformly around the circumference of the preform 70. Thus, the optical fiber preform 70 can easily break off near the connection region as the optical fiber preform 70 moves. These problems are more frequent among the optical fiber preforms 70 of greater diameters. Another technique in the contemporary practice uses a quartz rod 66b whose diameter is smaller than that of the preform 70, as illustrated in FIG. 2C. Such a sharp difference in diameters creates a situation exemplified by connection 68c of FIG. 2C. As the connection 68c enters the furnace 60, the pressure and the flow speed of the inert gases 92 in the furnace 60 suddenly change. A sharp change in diameter of the material entering the furnace 60 causes sudden changes in the pressure and the flow speed of the inert gases 92 in the furnace 60. This sudden change, in combination with the tension from pulling force on the optical fiber (such as due to the capstan 110) and pulling speed (which determines the fabrication speed) and diameter irregularities of optical fiber preform 70 and other effects from the sharp diameter difference lowers the quality of the resulting optical fiber 90.

Therefore, to satisfactorily use a large diameter optical fiber preform 70 with a graphite resistance furnace 60, there should not be a large difference between the outer diameters of the optical fiber preform 70 and a quartz rod 66b so as to have a smooth connection between the optical fiber preform 70 and the auxiliary quartz rods 66a and 66b. Moreover, the diameter of the optical fiber preform 70 along its entire length should be uniform. As stated above, as the optical fiber preforms 70 of larger diameters are used, smoothly connecting the optical fiber preform 70 to the auxiliary quartz rods 66a and 66b becomes more difficult. Thus, a portion of the optical fiber 90, the portion of the optical fiber 90 that have been fabricated from the optical fiber preform 70 within 200 mm from the end of the optical fiber preform 70, has irregular diameters. This is an optical fiber 90 of inferior quality.

Figure 6:
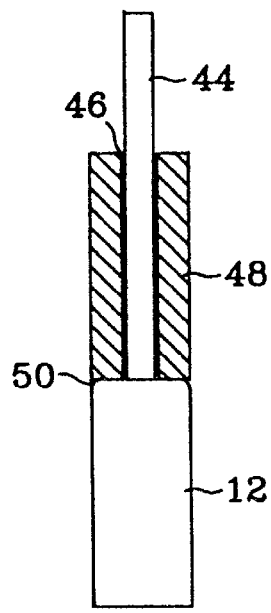
FIG. 6 illustrates one situation of an optical fiber preform connected to an auxiliary quartz rod and tube built according to the principles of the present invention.
Figures 7A, 7B:
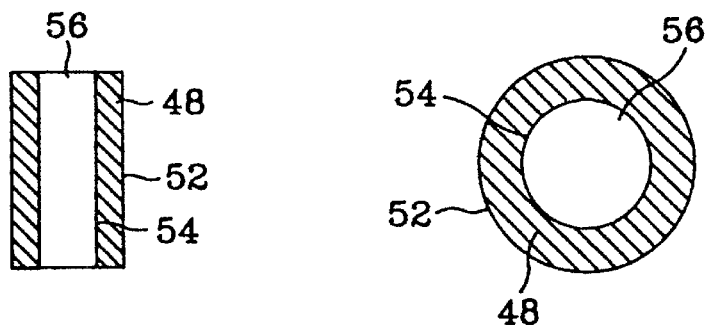
FIG. 7A is a sectional view of a structure used to maintain the diameters of an auxiliary quartz tube and a preform of optical fibers at the same diameter, built according to the principles of the present invention.
FIG. 7B is an another sectional view of tile structure used to maintain the diameters of an auxiliary quartz tube and a preform of optical fibers at the same diameter, built according to the principles of the present invention.

The present invention gives a solution to this problem. A preferred embodiment of the present invention will be described in detail with reference to attached figures. FIGS. 6, 7A and 7B are sectional views showing a method and an apparatus for connecting an optical fiber preform to an auxiliary quartz rod and tube.

The first step of this method is to connect the optical preform 12 to an auxiliary quartz rod 44 of a smaller diameter than the diameter of the preform 12. This is easily performed because of the smaller diameter of the quartz rod 44.

The second step is to position an auxiliary quartz tube 48, made of the same material as the preform 12, around the quartz rod 44 of smaller diameter. Then, the auxiliary quartz tube 48 is set to rest on top of the preform 12. This prevents problems in fabricating the optical fiber 40, such the problems due to large variations in diameter between the auxiliary quartz rod 44 and the optical fiber preform 12. The outer diameter of the quartz tube 48 is the same or approximately same as that of the preform 12. The inner diameter of the quartz tube 48 is such that a gap 46 of a predetermined size is formed when the quartz tube 48 encloses the auxiliary quartz rod 44. In a typical situation, Is the gap 46 is greater than 0.5 mm and less than 4 mm. The outer diameter of the quartz tube 48 may differ from the outer diameter of the preform, typically up to a difference of 0.5 mm. The length of the quartz tube 48 is usually more than 50 mm. More than two quartz tubes of shorter lengths may be used together to form a net length of more than 50 mm.

The third step is mounting the preform 12 connected to the quartz rod 44 and the quartz tube 48 to a chuck 62 of an optical fiber fabricating apparatus, and "spinning" (i.e. drawing and fabricating) the optical fibers 40.

The method described above has several advantages. It is easy to use because the quartz tube is easily attached to and removed from an optical fiber preform and an auxiliary quartz rod. It reduces production cost because of the increased possibility of recycling. The connection is made very simply when the large diameter preform is connected to an auxiliary quartz rod.

When a connection with the preform 12 is made as described above, the connection between the quartz tube 48 and the preform 12 is has a slight inward depression. This is because when a preform 12 and an auxiliary quartz rod 44 are heated before their connection, the flame of the burner rounds the sharp edges of the preform 12. This slight depression would cause the conditions inside of a graphite resistance furnace 60, of the contemporary practice, to change as soon as the depression of the resulting structure enters the furnace 60. If an inlet sleeve 16 in a furnace according to the present invention is used, the depression formed at the connection 50 between the preform 12 and an auxiliary quartz rod 44 has less effect on the conditions inside of the furnace 10.

Figure 4:
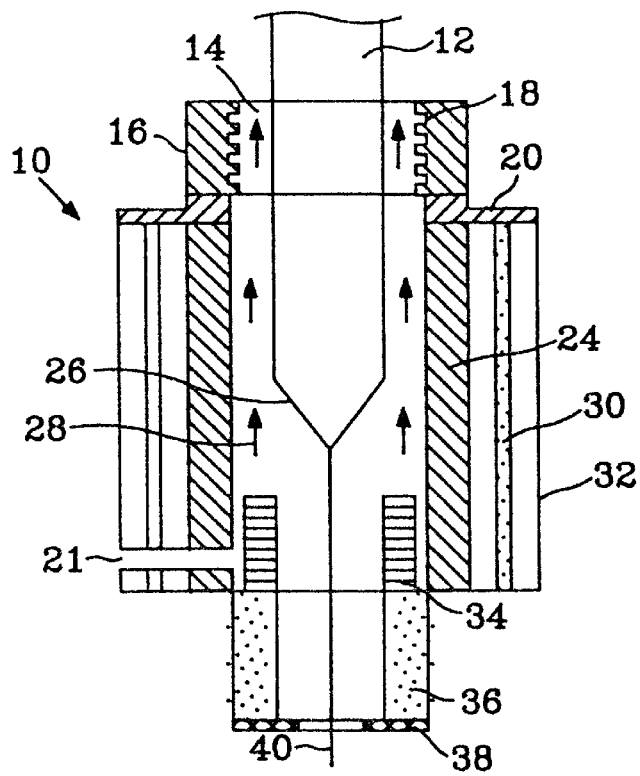
FIG. 4 is a sectional view of a structure of the furnace of an optical fiber spinning apparatus built according to the principles of the present invention.
Figure 5A:
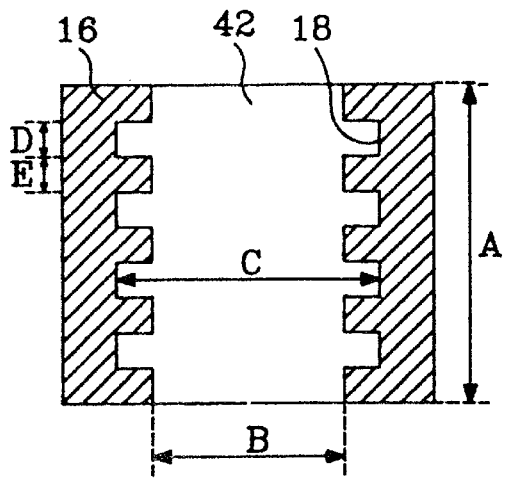
FIG. 5A is a sectional view of a structure of the inlet sleeve installed on the top of the furnace built according to the principles of the present invention.
Figure 5B:
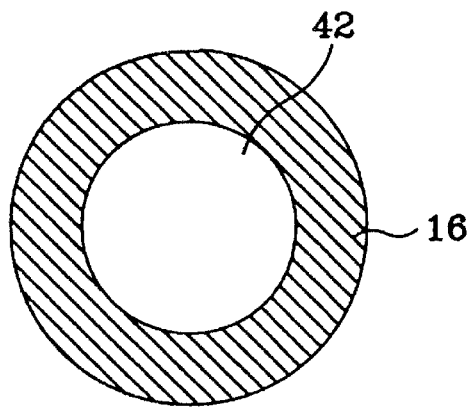
FIG. 5B is an another sectional view of the structure of the inlet sleeve installed on the top of the furnace built according to the principles of the present invention.

FIG. 4, FIG. 5A, and FIG. 5B are sectional views of the furnace and the inlet sleeve of an optical fiber fabrication apparatus according to the present invention. In a furnace 10, a heating element 24, with high electrical resistance for generating high temperatures. The heating element 24 liquefies an optical fiber preform 12, thus pemitting an optical fiber 40 to be spun out of the furnace 10. Around the heating element 24, an insulator 30 is installed to prevent the heat generated by the heating element 24 from escaping. Near inside bottom of the heating element 24, a graphite bottom sleeve 34 is installed. On the top of heating element 24, a gas-diffuser 20 is installed. At a bottom of heating element 24, another gas-diffuser 21, supplying inert gases 28, is installed. Below the heating element 24 and near a bottom of furnace 10, an extended unit 36 is installed. At a bottom of the extended unit 36, an iris 38 is formed. The iris 38 controls the size of the hole through which optical fiber is drawn.

On the other side of the furnace from the iris 38, an inlet sleeve 16 is installed on a top of the gas-diffuser 20. The inlet sleeve 16 is aligned with the central axis of the heating element 24. The inlet sleeve 16 minimizes pressure fluctuations within the heating element 24 and minimizes the variation in flow rate of the inert gases 28. The inner diameter of the inlet sleeve 16 is greater than the diameter of the preform 12 by at least 0.5 mm. The inner diameter of the inlet sleeve 16 is less than 8 mm. The inlet sleeve 16 is formed with at least one uniform groove 18, uniformly grooved around the inner circumference of inlet sleeve 16, to provide a strong resistance against the outward flow of the inert gases 28. Referring to FIG. 5A, the inner diameter C of a groove 18 is greater than the inner diameter B of the inlet sleeve by at least 1 mm (i.e. the depth of the groove is at least 0.5 mm). The width D of the groove 18 is at least 1 mm. The distance E between grooves is at least 1 mm. The height A of the inlet sleeve 16 is at least 10 mm. In a typical situation, an inlet sleeve 16 has a height A of 450 mm The inner diameter B of such an inlet sleeve is 53 mm. The inner diameter C of a typical groove 18 is 56 mm, (i.e. the depth of the groove is at least 1.5 mm). The width D of the groove 18 is 5 mm. A typical distance E between the grooves 18 is 5 mm. At least two grooves 18 may be formed with different diameters.

The inlet sleeve 16 with such grooves 18 is part of a furnace 10. The optical fiber preform 12 is inserted into the furnace 10 through the center of the inlet sleeve 16. The inert gases 28 leave the furnace 10 through a first gap 14 between the optical fiber preform 12 and the sleeve 16. The effect of these inert gases 28 leasing the furnace upon the conditions inside the furnace 10 is minimized because the inlet sleeve 16 of the furnace 10 is formed with a height A, providing the furnace 10 with a greater height than that of the typical furnace 60 of the contemporary practice and because the inner surface of the sleeve 16 has many grooves 18 of different diameters, thus offering a large resistance against the inert gases 28 as they leave the furnace 10 through the first gap 14.

Therefore, the furnace 10 minimizes the lowering of the quality of optical fibers, especially those lowerings of the quality that stems from variations of the conditions inside of the furnace. As noted above, these variations can occur when a preform) is connected to an auxiliary quartz rod of differing diameters. Also, the furnace has an inlet sleeve which minimizes fluctuations in flow speed of the inert gases and the pressures inside the furnace. These fluctuations can occur when the preform is connected to an auxiliary quartz rod with some localized diameter variations.

While there have been illustrated and described what is to be considered the preferred embodiment of the present invention, it will be understood by those skilled in the art that various changes and modifications may be made, and equivalents may be substituted for elements thereof without departing from the true scope of the present invention. In addition, many modifications may be made to adapt a particular situation to the reaching of the present invention without departing from the scope thereof. Therefore, It Is understood that the present invention is not limited to the particular embodiments disclosed as the best mode contemplated for carrying out the present invention, but embodiments falling within the scope of the appended claims.

What is claimed is:

1. An optical fiber fabrication apparatus, comprising:
   furnace having a first opening and a second opening, said furnace comprising:
   an inlet sleeve having an inner surface, the inner surface of the inlet sleeve including a groove around an inner circumference of the inlet sleeve, the inlet sleeve resisting a flow of inert gas from within the furnace, said flow of gas being exhausted from said furnace via said inlet sleeve; and
   a heater positioned to apply heat to an optical fiber preform entering the furnace through the first opening, so as to allow an uncoated optical fiber to be drawn through the second opening;
   an auxiliary quartz rod having an outer diameter smaller than an outer diameter of the optical fiber preform, the auxiliary quartz rod being connected to one end of the optical fiber preform; and
   an auxiliary quartz tube, mountable within a chuck, having an inner diameter greater than the outer diameter of the auxiliary quartz rod, said auxiliary quartz tube being positioned over said auxiliary quartz rod and resting on, and unattached to, said one end of the optical fiber preform, an outer diameter of said auxiliary quartz tube being approximately the same as the outer diameter of the optical fiber preform.

2. The optical fiber fabrication apparatus as set forth in claim 1, wherein said auxiliary quartz tube has an outer diameter equal to the outer diameter of said optical fiber preform.

3. The optical fiber fabrication apparatus as set forth in claim 2, wherein said outer diameter of said auxiliary quartz tube and said outer diameter of said optical fiber preform differ up to 0.5 mm.

4. The optical fiber fabrication apparatus as set forth in claim 1, wherein sidewalls of said groove are perpendicular to a bottom of said groove.

5. The optical fiber apparatus as set forth in claim 1, wherein said inlet sleeve comprises a plurality of grooves around said inner circumference for resisting said flow of inert gas from within said furnace.

6. The optical fiber fabrication apparatus as set forth in claim 5, wherein sidewalls of each of said grooves are perpendicular to a corresponding bottom of said groove.

7. The optical fiber fabrication apparatus as set forth in claim 6, wherein the bottom of each of said grooves has a predetermined width and each of said grooves are separated by said predetermined width.

8. The optical fiber fabrication apparatus as set forth in claim 1, wherein said groove has a depth of 0.5 mm and a width of 1 mm.

9. The optical fiber apparatus as set forth in claim 8, wherein said inlet sleeve comprises a plurality of uniformly space grooves around said inner circumference for resisting said flow of inert gas from within said furnace.

10. The optical fiber fabrication apparatus as set forth in claim 1, wherein said groove has a depth of 1.5 mm and a width of 5 mm.

11. The optical fiber apparatus as set forth in claim 10, wherein said inlet sleeve comprises a plurality of grooves around said inner circumference for resisting said flow of inert gas from within said furnace, each of said grooves being separated from an adjacent groove by 5 mm.

12. An optical fiber fabrication furnace, comprising;
    a top wall having a first opening;
    a bottom wall, at an opposite end of said furnace from said top wall, having a second opening;
    an inlet sleeve having an inner surface and a first opening, the inner surface of the inlet sleeve including a groove, said groove having sidewalls perpendicular to a bottom thereof for resisting a flow of inert gas from within the furnace, said flow of gas being exhausted from said furnace via said inlet sleeve;
    a heater disposed to apply heat to an optical fiber preform entering the furnace through the first opening, as an uncoated optical fiber is to be drawn through the second opening.

13. The furnace according to claim 12, wherein:
    the inlet sleeve has an inner circumference and an outer circumference, and
    the groove is formed in the inner circumference of the inlet sleeve.

14. The furnace according to claim 13, wherein the groove is uniform around the inner circumference.

15. The furnace according to claim 12, wherein:
    a depth of the groove is at least one-half a millimeter;
    a width of the groove is at least one millimeter; and
    a length of the inlet sleeve is at least ten millimeters.

16. The furnace according to claim 12, wherein:
    the inlet sleeve comprises more than one groove; and
    a separation between adjacent ones of said grooves is at least one millimeter.

17. The furnace according to claim 12, wherein:
    the inlet sleeve comprises more than one groove; and
    at least one of said grooves has a different depth from another of said grooves.

18. The furnace according to claim 12, wherein the heater comprises an electrical heating element.

19. The furnace according to claim 18, wherein the furnace further comprises an insulator surrounding the heating element, said insulator disposed to prevent heat generated by the heating element from escaping.

20. The furnace according to claim 18, wherein the furnace further comprises a graphite bottom sleeve surrounded by the heating element and adjacent to the second opening.

21. The furnace according to claim 12, wherein the second opening further comprises an adjustable iris.

22. The furnace according to claim 12, wherein an inner diameter of the inlet sleeve is greater than a diameter of the optical fiber preform by at least one-half a millimeter, and the inner diameter of the inlet sleeve is less than eight millimeters.

23. An optical fiber fabrication apparatus, comprising:
a furnace having a first opening and a second opening, said furnace comprising:
- an inlet sleeve having an inner surface, the inner surface of the inlet sleeve including a plurality of grooves formed in the inner circumference of the inlet sleeve, said grooves being uniformly spaced apart from each other and resisting a flow of inert gas being exhausted from within the furnace through said inlet sleeve; and
- a heater positioned to apply heat to an optical fiber preform entering the furnace through the first opening, so as to allow an uncoated optical fiber to be drawn through the second opening;

an auxiliary quartz rod having an outer diameter smaller than an outer diameter of the optical fiber preform, the auxiliary quartz rod being connected to one end of the optical fiber preform; and an auxiliary quartz tube, mountable within a chuck, having an inner diameter greater than the outer diameter of the auxiliary quartz rod, said auxiliary quartz tube being positioned over said auxiliary quartz rod and resting on, and unattached to, said one end of the optical fiber preform, an outer diameter of said auxiliary quartz tube being approximately the same as the outer diameter of the optical fiber preform.

24. The optical fiber fabrication apparatus as set forth in claim 23, wherein each of said grooves comprise a pair of sidewalls and a bottom, said sidewalls being perpendicular to said bottom.

25. The optical fiber fabrication apparatus as set forth in claim 23, wherein said outer diameter of said auxiliary quartz tube and said outer diameter of said optical fiber preform differ up to 0.5 mm.

* * * * *